United States Patent
Schofield et al.

(10) Patent No.: US 6,568,215 B2
(45) Date of Patent: May 27, 2003

(54) METHOD AND APPARATUS FOR MELTING A PARTICULATE MATERIAL

(75) Inventors: John Anthony Schofield, Risley Warrington (GB); James Lucas, Liverpool (GB)

(73) Assignee: British Nuclear Fuels PLC., Warrington (GB)

( * ) Notice: Subject to any disclaimer, the term of this patent is extended or adjusted under 35 U.S.C. 154(b) by 316 days.

(21) Appl. No.: 09/774,493

(22) Filed: Jan. 31, 2001

(65) Prior Publication Data

US 2002/0043082 A1 Apr. 18, 2002

Related U.S. Application Data

(63) Continuation of application No. 09/101,479, filed on Apr. 19, 1999, now abandoned.

(30) Foreign Application Priority Data

Jan. 17, 1996 (GB) ............................................. 9600895
Jan. 16, 1997 (WO) .............................. PCT/GB97/00119

(51) Int. Cl.$^7$ .......................... C03B 19/00; C03C 10/00
(52) U.S. Cl. ............................. 65/33.2; 65/33.9; 65/66; 65/82; 65/134.7; 65/134.8; 65/135.6; 65/144; 65/355; 65/DIG. 4; 219/683; 588/11; 373/27; 373/156; 373/157; 264/432; 264/434; 264/460; 264/489; 264/490
(58) Field of Search ................................ 65/33.2, 33.9, 65/66, 82, 134.7, 134.8, 135.6, 144, 182.5, 355, DIG. 4; 219/683; 588/11; 422/250.1; 373/27, 156, 157; 264/432, 434, 460, 489, 490

(56) References Cited

U.S. PATENT DOCUMENTS

| | | | |
|---|---|---|---|
| 1,684,800 A | * | 9/1928 | Maximoff et al. |
| 3,151,964 A | * | 10/1964 | North |
| 4,660,212 A | * | 4/1987 | Boen et al. |
| 4,801,435 A | | 1/1989 | Tylko |
| 5,563,904 A | * | 10/1996 | Colpo et al. |

FOREIGN PATENT DOCUMENTS

| | | |
|---|---|---|
| EP | 349 405 | 1/1990 |
| EP | 369 642 | 5/1990 |
| EP | 398 699 | 11/1990 |

(List continued on next page.)

OTHER PUBLICATIONS

Morrell et al., *An Active Pilot Plant Demonstration of the Microwave Vitrification Process*, published in the United Kingdom Atomic Energy Authority Harwell, Department of the Environment, Radioactive Waste Management Research Program, 19983–86, Jan. 1986.

A.J. Dobson and B. Smith, *The Windscale Vitrification Plant,*, British Nuclear Fuels PLC, 1995.

*Primary Examiner*—Michael Colaianni
(74) *Attorney, Agent, or Firm*—Workman, Nydegger & Seeley

(57) ABSTRACT

Apparatus suitable for vitrifying nuclear waste comprises a tunable microwave cavity connected by a first wave guide to a source of microwave energy; cooling coils for cooling the exterior of the cavity; a hopper for loading particulate fusible material to the interior of the cavity; within the cavity a crucible made of melted and re-solidified fusible particulate material; an exit-chamber connected by a second waveguide to a second microwave source; and a pipe for supplying argon gas to the exit chamber so that a plasma torch can be generated. The separating of the crucible form the cavity walls by unmelted material gives significant advantages in case of cleaning and reduced energy consumption.

45 Claims, 3 Drawing Sheets

FOREIGN PATENT DOCUMENTS

| | | | |
|---|---|---|---|
| EP | 507 668 | | 10/1993 |
| FR | 2 340 781 | | 9/1977 |
| GB | 2122859 | * | 1/1984 |
| GB | 2 122 859 | | 1/1984 |
| GB | 2 140 902 | | 12/1984 |
| GB | 2140902 | * | 12/1984 |
| GB | 2 224 106 | | 4/1990 |
| WO | 95 04004 | | 2/1995 |
| WO | 95 17981 | | 7/1995 |

* cited by examiner

METHOD AND APPARATUS FOR MELTING A PARTICULATE MATERIAL

This application is a continuation of U.S. patent application Ser. No. 09/101,479, filed on Apr. 19, 1999, titled METHOD AND APPARATUS FOR MELTING A PARTICULATE MATERIAL, now abandoned, which claims priority to United Kingdom Application No. 9600895.8, filed Jan. 17, 1996, which applications are incorporated herein by specific reference.

BACKGROUND OF THE INVENTION

1. The Field of the Invention

This invention relates to a melting process for a particulate material in which the main heat source is microwave energy.

2. The Relevant Technology

UK Patent No: 2122859A, UKAEA, discloses the use of microwave energy to heat a material, such as a glass, in a container having a cooled outer surface, the arrangement being such that a layer of melted and re-solidified material, known as a "skull", is formed in contact with the internal surface of the container. Whilst the skull protects the container wall and avoids reactions between it and the melt, the container cannot easily be cleaned as the material adheres to the walls. Furthermore, start-up may be slow due to poor microwave heating of the materials to be melted at low temperature.

UK Patent No: 2228476 VERT Ltd. discloses a cold-top melter furnace in which a blanket of unmelted glass frit is maintained above the molten glass, the blanket thickness assisting in retaining volatiles. However, infrasound energy is specifically used to prevent the formation of a skull of solidified glass. This ensures that the molten glass is in contact with the furnace wall, and reactions may occur as a result.

BRIEF SUMMARY OF THE INVENTION

It is an object of the present invention to avoid the disadvantages of the two known methods.

According to the invention apparatus for melting a fusible material comprises:

- a microwave cavity;
- means for cooling the exterior of the cavity;
- means for supplying the fusible material to be melted to the interior of the cavity;
- a crucible within the cavity and spaced from its walls by a layer of unmelted material, said crucible being formed from melted and re-solidified material; and
- means for supplying microwave energy to the cavity of such power that fusible material in the interior of the crucible is melted.

The material to be melted may be in particulate form and/or liquid form. The particles may be between 0.5 and 10 mm and preferably 1 to 5 mm in size and/or have a volume of 1 $mm^3$ to 100 $mm^3$.

The material to be melted may be a preformed material, such as glass particles. The material to be melted may comprise materials to be melted to form a further material. For instance glass forming materials may be added to the cavity. Glass forming materials may include sand, sodium carbonate, lime or calcium carbonate. The sand may be replaced wholly or partially by other acidic oxides, such as $B_2O_3$ or $P_2O_5$ and/or with potassium, lithium, alkali earth metal or lead oxides.

The material to be melted may be fed to the cavity together with other materials which are not intended to be melted by the cavity. Thus higher temperature materials may be introduced and dispersed in a melt of the melted materials. The materials to be melted may comprise a matrix forming material and a material to be dispersed within that matrix. A glass matrix in which waste material is dispersed may be provided in this way. The material may be calcined or partially calcined prior to feeding.

The cavity may be microwave tunable. The cavity may be at least partially microwave tuned by its physical dimensions. The cavity may have four side walls, a bottom and top wall. The cavity may be provided in substantially spherical configuration. The cavity may have an internal volume of 2 to 500 liters and is preferably 10 to 300 liters.

The material from which the crucible has been formed may be the same as the fusible material to be melted within the crucible, and/or the same as the unmelted material. Different fusible materials may be used Preferably the crucible is formed of the same material as the unmelted material, the crucible being formed from melted and re-solidified such material. Preferably, the unmelted material remains substantially as fed to the cavity. The crucible is preferably liquid impermeable. The layer forming the crucible may be between 0.5 and 10 cm thick and is preferably 1 to 5 cm thick. The thickness of the material forming the crucible may vary between different locations. Preferably the crucible is substantially ovoid in shape. Preferably the crucible is spaced from the walls defining the cavity by the unmelted material over at least 80% of its surface area. Levels of 90 and 95% are to be preferred and most preferably no contact between the crucible and the cavity walls occurs. Preferably the crucible is made of glass.

Preferably the unmelted material is in particulate form with voids between individual particles. Preferably the unmelted material is of the same material as the crucible. The unmelted material may be provided in particles of between 1 and 5 mm. Preferably the unmelted material remains free to move relative to other portions of the unmelted material and most preferably relative to the crucible. Preferably the unmelted material provides a layer between the crucible and the cavity wall. Preferably the layer is at least 1 cm thick and more preferably 3 cm thick over at least 90% of the surface area of the crucible.

The material to be melted may be fed to the cavity by feed means such as a hopper. Preferably the fusible material feed means are provided above the cavity. Gravity feed may be relied upon to convey the fusible material into the cavity. Preferably the material is fed on to the top of the skull. Preferably the material is kept topped up within the cavity, most preferably contact between the top cavity wall and the unmelted material is maintained. Sensing means may be provided in the material feed means to determine the level of feed material. The feed means may introduce the feed into the cavity by means of a passage. Microwaves may also be introduced into the cavity by means of this passage. Preferably a column of feed material is maintained in the feed means, in gaseous contact with the cavity. In this way the column feed material can act as a filter for off gases from the melt.

The means for cooling the exterior of the cavity may comprise radiation and/or convection and/or conduction of energy away from the exterior cavity surface. Additional means may be provided to supplement the natural cooling of the cavity. One or more heat exchangers may therefore be provided in proximity to the exterior of the cavity. Heat exchangers may be provided inside the cavity and/or inside the cavity wall and/or in thermal contact with the exterior of the cavity. The provision of the heat exchanger means in contact with the exterior of the cavity is preferred for simplicity of construction. The heat exchanger may employ forced air or other forced fluid flow, such as water. Preferably the cooling means comprise one or more pipes in contact with the exterior surface of the cavity. Preferably the flow of fluid through the heat exchanger is variable. In this way the cooling extent can be varied as desired.

Preferably the microwave energy source is separated from the cavity by a fluid impermeable barrier, permeable to microwaves. Alumina, quartz, polythene or other barrier materials may be employed.

The microwave source may have a power of between 10 and 50 Kw. Preferably the power output from the microwave source is controllable.

The microwave source and/or cavity may be provided with tuning means. Preferably coarse tuning means are provided for the cavity. The coarse tuning means may be provided in a passage leading from the cavity. The cavity and passage may be separated by a fluid impermeable barrier which is permeable to microwaves. A tuning stub may be employed.

Coarse tuning means for the cavity may be provided, preferably in the form of moveable shutters. Preferably the shutters are presented in the microwave guide leading to the cavity. This microwave guide may also serve as the feed route for the fusible material.

Preferably there is further provided further means for supplying energy to material/particles within said cavity and/or crucible. The further energy means may be used during the crucible formation process and/or during tapping of the molten core. Preferably the further means are located/generated below the cavity. The further means may extend into the cavity.

The further means may be a plasma, a plasma being formed when gas-filled voids within the crucible are exposed to microwave radiation. The gas may be drawn into the cavity during draining and/or specifically introduced and/or formed in the cavity. A loading cavity may be generated in the upper part of the crucible, by melting the appropriate area of the crucible, due to plasma formation in a void formed by draining the core. Such a plasma may be used to provide initial heating of particles within the cavity. A plasma torch is preferably formed in the exit aperture from the cavity. The plasma torch may be formed by feeding a gas jet, such as an argon stream, to the exit resonant cavity. The plasma torch may be used to drain melted material from the lower part of the crucible.

Alternatively, the further means may be a microwave source acting on lossy material which have been added to the cavity. A lossy material is heated through ohmic or dielectric effects of the microwaves. Such further means are preferred during initial heating of the cavity contents. The lossy material may be graphite and/or components of the waste material to be processed or vitrified. Graphite rods and/or blocks and/or powder may be used.

The further means may be an induction heater, for instance of the radio frequency type. The induction heater may be used to melt material in the lower part of the crucible, above the exit, to tap the molten core. The induction heater may be in the form of a inductor round a metal collar, the collar extending through the aperture into the bottom of the cavity. Preferably cooling means are provided in conjunction with the metal collar. Preferably the collar is spaced from the cavity wall by an insulating material, such as a ceramic. The ceramic may be spaced over the substantial part of its area from the cavity wall also, the spacing being maintained by a limited area rib present on the insulating member.

The further means may comprise means for providing preferential conduction between a first and a second location within the cavity. Such means are particularly preferred for use during tapping process. Preferential conductors may be in the form of metallic or other thermally conductive elements, such as graphite, which are positioned between the hotter molten core of the cavity and the cooler material surrounding the exit. In this way preferential heat conduction from a core towards the exit could be provided, melting the material near the exit and so tapping the core. Graphite rods are particularly preferred for this function.

According to a second aspect of the invention, we provide a method for providing apparatus for melting material comprising:

supplying a fusible material to the interior of a microwave cavity;

cooling the exterior of the cavity;

supplying microwave energy to the cavity of such power that material within the cavity melts to form a melt pool spaced from the cavity walls by unmelted material;

causing a portion of the melted material to re-solidify around the melt pool; and whereby a crucible formed from melted and re-solidified material is provided within the cavity and spaced from its walls by a layer of unmelted material.

Preferably the fusible material is in particulate form. Preferably the fusible particles are glass particles or glass forming materials.

Preferably the cavity is microwave tunable. Preferably the cavity is tuned to provide maximum microwave absorbency at the centre of the cavity.

Preferably the re-solidification is caused by removing the microwave energy input. Alternatively or additionally the re-solidification may be caused by decreasing the microwave energy input. Alternatively or additionally the re-solidification may be caused by increasing the exterior cooling of the cavity.

The crucible may be formed from the same material as the layer of unmelted material.

The centre of the melt pool may be allowed to drain from the cavity. It is preferred, however, that the melt pool only be partially drained from the cavity. Preferably draining the cavity leads to the introduction of further fusible material to the top of the cavity. The further feed material may be heated due to plasma formation in the void left by the material drained from the cavity. Preferably the particles at the centre of the cavity are initially heated by use of a plasma torch, preferably generated when an inert gas such as argon is supplied to the cavity and/or exit. The microwave energy may be applied to the cavity simultaneously with the plasma and/or plasma torch or alternatively the microwave energy may be applied after a portion of the material in the cavity becomes molten. Initial heating may be affected by applying microwave energy to lossy materials present within the microwave cavity. The lossy materials may be introduced into the microwave cavity along with the fusible material feed.

The melt pool may be tapped by melting the material between the melt pool and an exit aperture in the cavity. The melting of this material may be affected by the application of a plasma torch. Alternatively or additionally the melting of this material may be affected by an induction heater. Alternatively or additionally the melting of this material may be affected by preferential conduction of heat away from the melt pool towards the exit aperture.

The apparatus for melting particulate material may subsequently be used for melting similar or different fusible particles or materials or liquids. For example it may be used to process a high purity glass such as an optical glass, or a high melting point glass. Alternatively, the apparatus may be used to vitrify nuclear waste provided as a mixture of glass frit and calcined nuclear waste particles, or the material to be processed can be a mixture of waste materials and glass making materials.

Other features of the method for providing the apparatus are derivable from the first and third aspects of the invention and from the features described elsewhere in this application.

According to a third aspect of the invention we provide a method of melting a fusible material comprising supplying particles of material to the interior of a microwave cavity, the materials entering a crucible formed from melted and re-solidified material and spaced from the walls of the cavity by a layer of unmelted material, in which the material fed to the cavity and crucible is melted, energy being supplied to the crucible in the form of microwave energy, the melted material subsequently being tapped from the crucible.

The fusible material may be provided in preformed form, such as glass particles or may be added as the ingredients for a material to be formed, for instance sand, sodium carbonate, lime or calcium carbonate for forming glass. The fusible material may, therefore, be formed by the method of melting. Other materials which are not intended to be melted, but dispersed within the melt may be added.

Preferably the microwave energy applied to the cavity is tuned. Preferably the microwave energy is tuned to be preferentially absorbed within the crucible, and most preferably towards the centre of the crucible.

The fusible material may be the same or different to the re-solidified material forming the crucible.

The fusible material may be fed to the cavity under gravity feed conditions. Preferably a level of feed material is maintained over the crucible such that the top portion of that feed material is below 100° C. In this way volatiles seeping out of the melt will be condensed on the feed material before reaching the top of the feed material.

Preferably the fusible material is introduced through the top of the cavity. Preferably the microwaves are introduced through the top of the cavity. Most preferably both the feed and microwaves are introduced through the same passage way.

The exterior cooling is preferably performed by means of heat exchangers. A series of pipes wrapped around the cavity walls forms a particularly preferred method of cooling the exterior. Preferably water is passed through these pipes, most preferably forced through. The rate of cooling applied to the exterior of the cavity is preferably variable.

The method may include the provision of further energy input to the fusible material. Further energy input may be provided by means of a plasma and/or plasma torch and/or by means of an induction heater and/or by means of lossy materials introduced into the cavity. Introduction of lossy materials and/or the provision of a plasma torch below the crucible is particularly preferred during initial heating of the fusible material.

The additional energy input may assist in the tapping of molten material from the crucible. The use of a plasma torch below the crucible and/or of an induction heater below the crucible is particularly preferred in this regard. Alternatively or additionally preferential conduction of heat away from the molten core, towards the tapping aperture may be used to melt the material below the crucible and so tap the molten core in that way.

A plasma may be used to assist in melting the top portion of the crucible. The plasma may form in a void formed as the melt pool to at least partially drained. This process assists in feeding new frit to the crucible.

Other features and steps for the method of melting are set out in the first and second aspects of this invention and discussed elsewhere in the description.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIG. 4 illustrates a detail of part of FIG. 2.

DETAILED DESCRIPTION OF THE PREFERRED EMBODIMENTS

Figure 1:
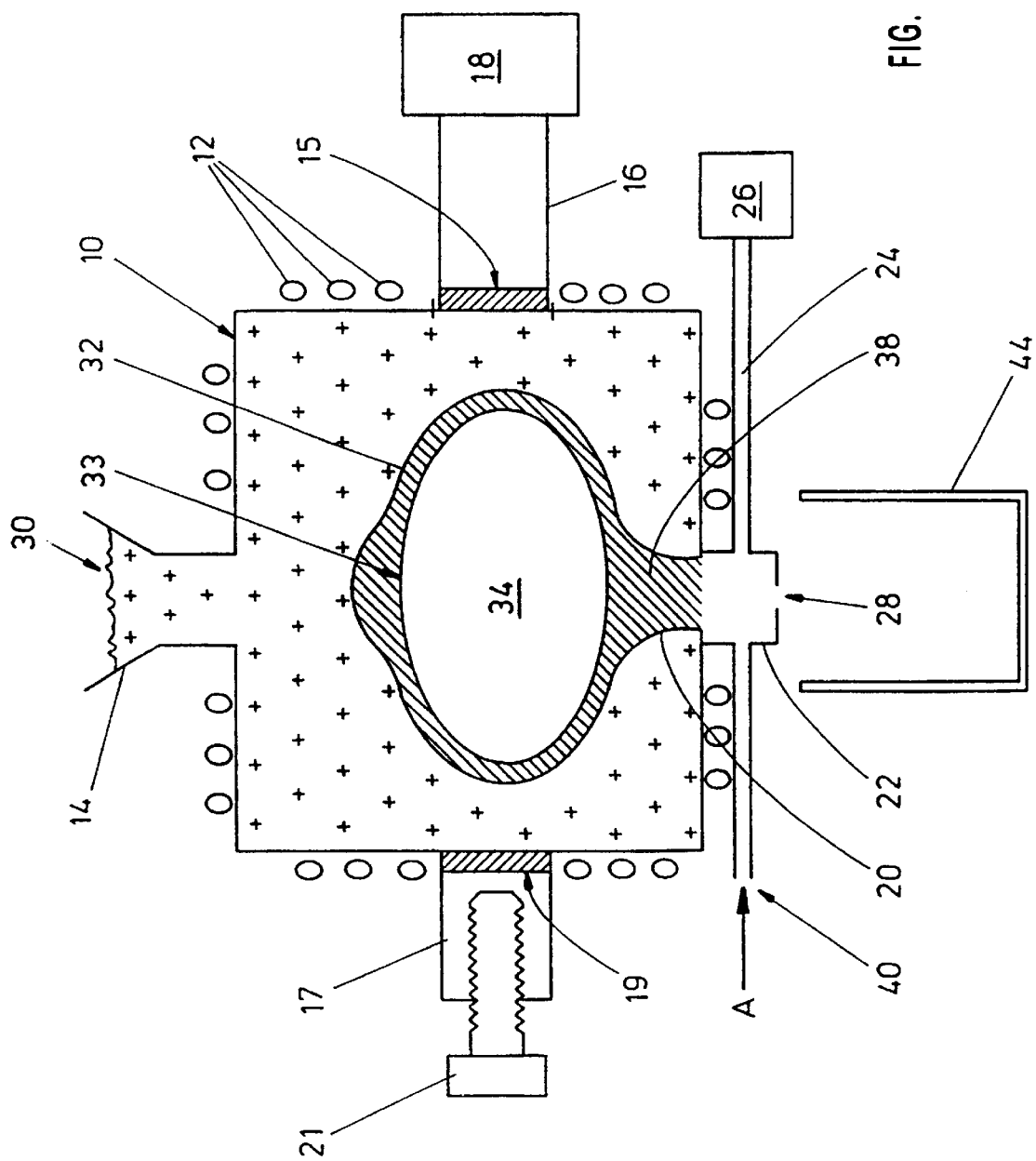
FIG. 1 illustrates apparatus provided according to a first embodiment of the invention during set up.

FIG. 1 provides a tunable microwave cavity 10 which has around its exterior a number of water cooling coils 12, and has above it a loading hopper 14.

A first waveguide 16 is connected at one end to one side of the microwave cavity by a quartz window 15, the other end of the waveguide 16 being coupled to a first microwave source 18.

At another side of the microwave cavity 10 a tuning cavity 17 is connected through a second quartz window 19; the tuning cavity being fitted with a fine tuning stub 21.

At the bottom of the cavity 10 there is an exit aperture 20 surrounded by an exit resonant cavity 22 which is coupled by a second wave guide 24 to a second microwave source 26. The exit cavity has a discharge aperture 28 in its lower surface. Below the exit aperture 28 is a discharge hopper 44.

Figure 2:
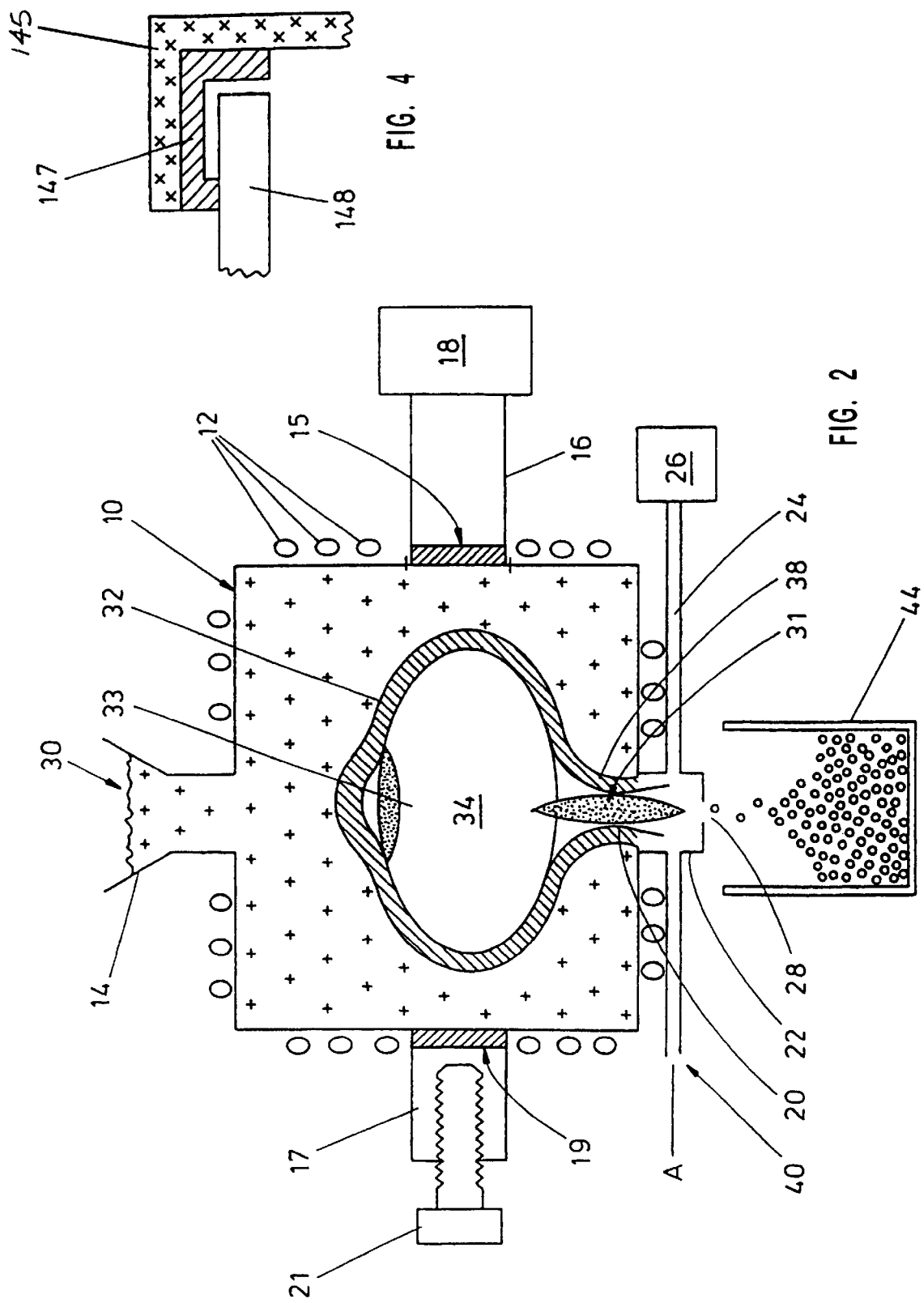
FIG. 2 illustrates apparatus according to the first embodiment during discharging.

A pipe 40 is connected to one side of the exit cavity 22, so that argon gas can be supplied, as indicated by the arrow A. To prepare the apparatus and the crucible 32 during initial set up, the microwave cavity 10 is initially filled with clean glass frit via the hopper 14 which is continually topped up. The cooling water is supplied to the coils 20, and the first microwave source 18 is switched on. At start-up, argon gas is supplied through the pipe 40, and the second microwave source 26 is also switched on. As a result an argon plasma, at the same region as illustrated in FIG. 2 by region 31, is generated and heats the frit on the axis of the cavity 10 as the argon gas permeates upwards. As the heat permeates into the cavity 10 the resistance of the frit/glass decreases. After a certain period, when the resistance of the glass on the axis has decreased sufficiently for heating by microwave energy to be efficient, the second microwave source 26 and argon gas supply 40 are switched off. Subsequent heating and melting continues by use of the first microwave source 18, the process now being resistive heating.

As the microwaves and cavity are tuned to one another maximum heating occurs at the centre of the cavity, and a pool of molten glass 34 forms and grows. A transition zone from molten material, outwards, through less molten, softened material forms as a result. This zone terminates at unmelted frit which spaces the transition zone and pool from the cavity walls as a result. The hopper 14 is kept topped up to feed the cavity 10 and prevent the formation of voids as the melt is more dense than the frit.

Eventually for a constant power setting of the first microwave source 18, the power input is balanced by heat loss from the exterior of the cavity 10 due to cooling.

The microwave source 18 is then shut off (or reduced in power, and/or the cooling is increased) and the melt is allowed to cool a little so that the ovoid shaped crucible 32 is formed. The crucible forms as previously largely molten material is allowed to re-solidify due to the inward retraction of the melted zone. During this initial stage, the funnel shaped throat/drain hole 38 contains solidified material formed after the plasma torch is turned off. The zone/throat 38 consists of a transition zone from unmelted frit, through partially melted frit to material which is effectively part of a soft skull.

The procedure for discharging is illustrated in FIG. 2. When it is required to discharge the melt from the crucible 32, the plasma torch is again ignited in cavity 22 and spreads to zone 31 to melt the solidified material within the throat 38. That the majority of the melt pool 34 can be drained into the discharge hopper 44. As the glass drains, a void is produced above the melt causing a plasma zone 33 to form towards the top of the skull which causes any frit above the crucible and/or remaining in the hopper to melt into the crucible recharging it. The microwave power is sufficient to spontaneously ignite the plasma 33.

After formation of the crucible 32, the hopper 14 can be loaded with a material to be processed. This may be a high purity glass, or a high melting point glass; alternatively the material to be processed can be a mixture of calcined nuclear waste and glass frit; alternatively, the material to be processed can be a mixture of waste materials and/or glass making materials.

The plasma torch 31, is used as start up for initial heating, as in preparation of the crucible 32, or for tapping the molten core, then melting continues by use of the first microwave source 18 as before. The transition from crucible formation (equipment set up) to processing of materials can be done in a continuous manner. In which case the core will remain molten throughout with the microwave source 18 applied and the feed will change over.

Volatile waste within the melt is prevented from escaping as it condenses above the melt on the surface of unmelted glass frit in the hopper.

The contents may be left to mix for 4 to 8 hours.

When vitrification and/or mixing has proceeded to the required level the plasma torch is reignited in zone 31 to melt a drainage hole in the throat 38. Some of the vitrified nuclear waste is discharged into the discharge hopper 44 and removed to a storage facility. At the same time, more material is added for processing through the top of the crucible. The tapping can then be stopped and this material allowed to mix with the existing material inside the crucible. After a further period of time has elapsed, more vitrified material is discharged into the discharge hopper 44 and material for processing is added through the top of the crucible. The material is processed continuously.

Figure 3:
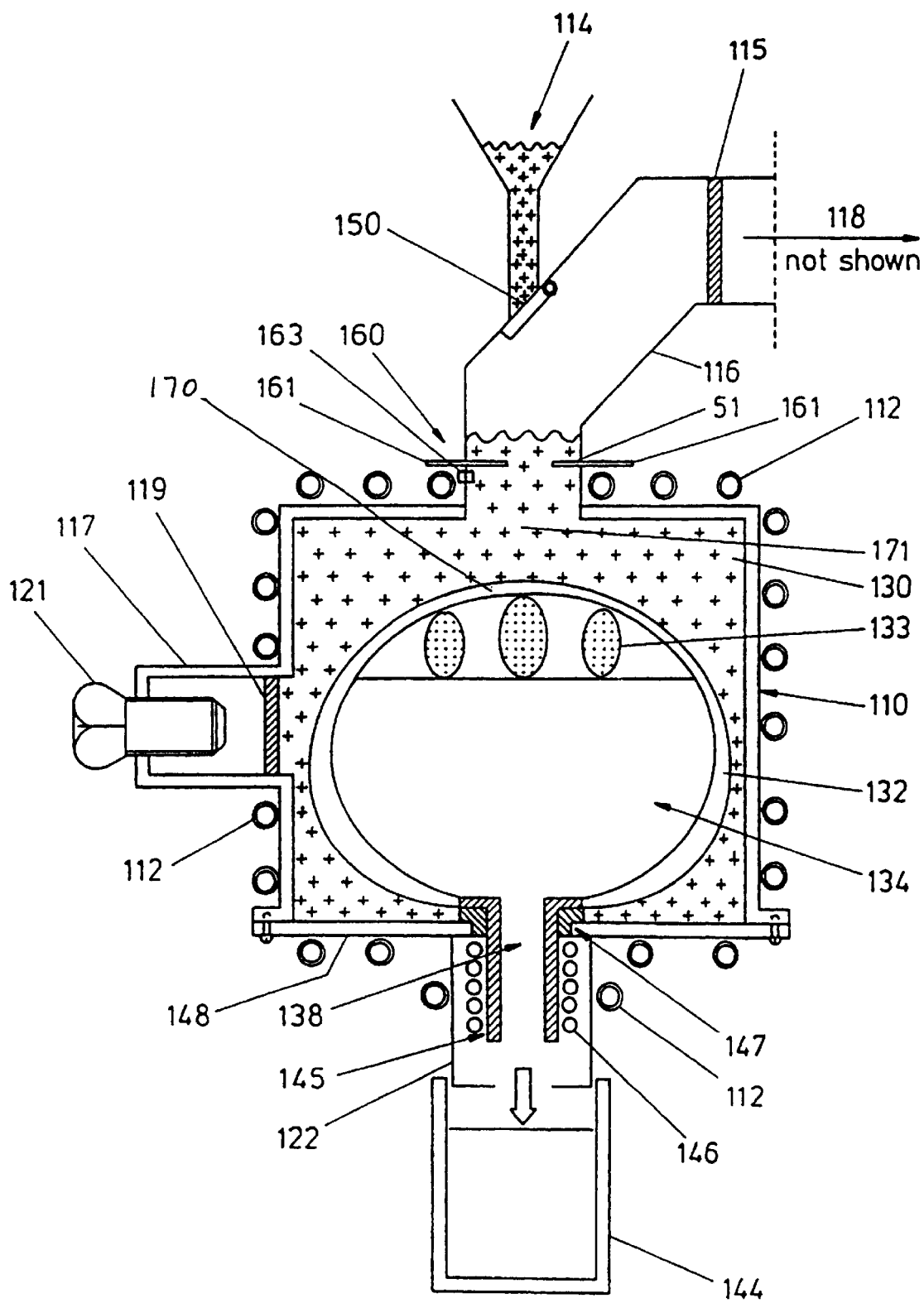
FIG. 3 illustrates apparatus provided according to a second embodiment of the invention.

The invention will now be described by way of FIG. 3.

The apparatus 110 consists of a four sided, top and bottom container. The dimensions are tuned as far as possible to the applied microwave frequency. The microwaves are introduced into the cavity through a temperature resistant, non permeable window 115 in waveguide 116 located above the cavity. The loading hopper 114 is fitted with a control valve 150 also leading to the waveguide 116. The wave guide 116 is fitted with a coarse microwave tuner 160 in the form of sliding shutters 161. The frit enters the apparatus by a gap between the shutters 161.

The wave guide also contains an optical sensor 163 used to monitor the frit level. The layer of unmelted frit particles fed to the apparatus above the skull act as a cold top filter 171 on to which volatile and particulate fumes generated within the melt can be condensed.

The cavity is provided with a number of external water cooling coils 112 around the periphery of the cavity.

A fine tuning cavity 117 is connected to the main cavity 134 through a temperature resistant, non permeable alumina window 119, the tuning cavity being fitted with a tuning stub 121.

The floor of the microwave cavity consists of a removable base plate 148 to allow cleaning of the apparatus. Attached to this plate 148 is an exit chamber 122 also provided with cooling coils 112 on its exterior surface. Within the exit chamber 122 is a metal drain pipe 145 around which is wound an induction heating coil 146. The drain pipe is separated from the base plate by a ceramic insulating piece 147. A raised section of the insulating piece ensures the minimum amount of contact between the metal drain pipe 145 and the base of the cavity, see FIG. 4.

The initial generation of the skull/crucible is achieved in a similar manner to that described for FIG. 1. The cavity is thus loaded with unmelted glass frit 130, part of which will subsequently form the crucible itself.

As an alternative to plasma torch heating of the frit to reduce its resistance to a point where the microwave heating works effectively, lossy materials which dissipate microwave energy at low temperatures can be introduced. When loading the frit into the cavity, therefore, lossy material such as graphite rods or blocks are positioned towards the centre of the cavity. The microwave source is then switched on and the coarse tuning shutters, and if desired fine tuning stub can be used to tune the filled cavity to the microwave frequency applied. The microwaves are absorbed and lead to a very significant heating of the graphite. This heat input, towards the centre of the cavity, is conducted and radiated to the surrounding glass frit and as a consequence leads to melting of it. As the level of molten glass frit increases the level of microwaves absorbed by it increases and soon direct heating of the frit by the microwaves is attained. The graphite absorbs a decreasing proportion of the microwaves under these conditions and eventually melts and is taken up in the material tapped from the cavity at a later point.

Maximum heating occurs at the centre of the cavity and a pool of molten glass 134 forms and grows.

The microwave source 118 is then reduced in power and the melt is allowed to cool so that the ovoid shaped skull 132 is formed.

In tests the skull shaped formed has been found to be separated by glass frit, completely unmelted, around the entire periphery of the skull. Thus the melted and re-solidified crucible extends down to the metallic collar of the induction heater, but is separated at all stages from the external walls of the cavity by unmelted glass frit. The shape is clearly illustrated in FIG. 3.

In order to remove the melt from the skull 132, the induction heating coil 146 is switched on. The coil acts to heat the drain pipe and melt the solidified material within the throat 138 above it. The skull 132 is eventually breached and the melt pool 134 is then drained into the discharge flask 144 to the desired extent.

The induction heating coil 146 is then switched off allowing the lower part of the molten glass to re-solidify ending tapping.

After the initial formation of the skull, the hopper 114 is loaded with the material to be processed. This may be high purity glass, or a high melting point glass; alternatively the material to be processed can be a mixture of calcined nuclear waste and glass frit; alternatively the material to be processed can be a mixture of waste materials and glass making materials.

The material is processed or vitrified by heating the skull using the plasma 133 until the top of the skull softens and collapses allowing the material in the hopper to be fed into the skull. Under the action of the microwaves and contact with the molten core this feed material is melted within the skull. The significant convection currents present within the molten core ensure thorough and efficient mixing of the materials.

Volatile waste within the melt is prevented from escaping as it condenses on the surface of unmelted glass frit in the cold top filter 171.

The volatiles present will vary depending on the feed materials involved, but in nuclear waste vitrification applications caesium and strontium gas products, amongst others, are encountered. A temperature gradient exists between the highest temperature in the molten core 134, through the lower temperature soft skull material 170 and down to still lower temperatures as progression is made away from the skull up the frit feed 171 stacked above the skull. Volatiles rising from the melt and seeping through the soft top of the skull will condense as they pass up the temperature gradient and contact the relatively cool frit 171. This frit moves gradually downwards as the processing progresses and carries the volatile material once more back into the melt 134. An equilibrium is reached in which the volatile level exiting in the tapped melt matches that in the feed materials entering the unit and with a circulation of volatiles out of the melt in gaseous form and back into the melt in condensed form on the feed frit. The cleaning action of the frit presents significant advantages in avoiding having to handle high temperature, toxic and potentially radiologically active off gas products.

When vitrification of the nuclear waste is complete the induction heating coil 146 is switched on to melt the glass plug in the throat 138. A portion of the vitrified waste is drained into the discharge flask 144.

At the same time, the skull softens once more and still further of the material to be processed is added through that part of the skull which has softened and collapsed. This material mixes with the already molten contents of the skull. After a period of time, more vitrified waste is removed by the process previously described and more material to be processed is added through the collapsed skull.

Vitrified material is collected in a discharge flask and removed to a waste storage facility.

Typically the microwave cavity 10 is 256 mm in diameter and 150 mm in height, the first microwave source 18 is a 35 kW source operating at 896 MHz. The second microwave source 26 operates at 2.46 GHz. The cavity 10 can hold 10–20 kilogrammes of glass, depending on the proportion which is molten, and a 10 kilogramme melt pool can be formed in 45 minutes with a power input of 10 kW. The peak temperature can be 1,200 degrees C. and convection flows of up to 3 mm per second may be generated by temperature differentials within the melt, which give effective mixing.

Re-tuning of the cavity during the formation process for the crucible, or during subsequent processing is possible. Re-tuning is not, however, generally necessary as the cavity once heated, absorbs from microwaves on a broad band basis negating the need for precise tuning. Precise tuning is, however, needed during the initial microwave heating phase as bandwidth absorbency is far lower at this stage requiring closer correspondence between the narrow band of microwaves generated by the magnetron and the narrow band width of microwaves which will be absorbed within the cavity.

The method and apparatus according to the invention have several advantages, especially for processing of nuclear waste.

The crucible 32 is not attached to or in contact with the wall of the microwave cavity 10. Because of this the cavity walls are not attacked chemically by the melt or contaminated by radioactivity from the melt.

Additionally, as the walls of the cavity are relatively cold and the frit around the walls relatively cool the kinetics of any attack on the cavity walls is very slow. The relatively cool frit also filters out and condenses volatiles which would otherwise attack the walls, a significant problem with prior furnaces.

At intervals, the cavity can be cleaned by removing its floor, removing the crucible 32 and the particulate material around it, and breaking up the crucible for recycling through the hopper 14. The unmelted and hence, free flowing, characteristics of the unmelted particles making the cleaning process very easy as the material literally falls away from the walls.

The particles plus voids nature of this material also mean it has a significant insulating effect reducing energy consumption for the process.

When radioactive waste is vitrified, it is a great advantage that there is no secondary waste such as metallic scrap, for instance from the cavity walls.

The use of a plasma torch or lossy materials permits easy start-up from cold, and the torch and/or induction heater and/or preferential conduction can be used to burn through the solidified glass sealing the lower throats 38 to permit the ready formation of drainage holes.

The separation of the crucible from the cavity walls by unmelted material also means that the crucible volume can be controlled and adjusted. A smaller crucible can be obtained by decreasing power and/or increasing cooling. A larger crucible can be formed by melting a greater portion of the surrounding material. A crucible of the desired volume and/or shape can thus be provided without having to alter the overall apparatus dimensions.

The cold feed above the melt pool and skull serves to filter out and/or remove by condensation any material exiting the top of the melt, such as off gases. This material is fed back into the melt as the process continues so adhering this problem.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. Apparatus for melting a fusible material comprises:
   a housing bounding a microwave cavity and having an exit aperture;
   means for supplying the fusible material to be melted to the interior of the cavity;
   a crucible within the cavity, at least a portion of the crucible being spaced from the housing by a layer of unmelted particulate material, the crucible bounding an opening adapted to hold molten material, the crucible being formed as a solid integral element from melted and re-solidified material;
   means for supplying microwave energy to the cavity of such power that fusible material in the interior of the crucible is melted to form a molten material; and
   means for melting material between the molten material and the exit aperture of the cavity.

2. Apparatus according to claim 1 in which the unmelted particulate material comprises glass particles.

3. Apparatus according to claim 1 in which the unmelted particulate material is comprised of materials that when melted form glass.

4. (Unchanged) Apparatus according to claim 1 in which the cavity is microwave tunable.

5. Apparatus according to claim 1 in which the material from which the crucible has been formed is the same as the unmelted particulate material.

6. Apparatus according to claim 1 in which the crucible has an external surface area, at least 80% of the external surface of the crucible being covered by the unmelted particulate material separating the crucible from the housing.

7. Apparatus according to claim 1 in which the unmelted particulate material has voids between individual particles.

8. Apparatus according to claim 1 in which the fusible material is introduced into the cavity by a passage and microwaves are also introduced into the cavity by the passage.

9. Apparatus according to claim 8 in which a column of the fusible material is maintained in the passage, in gaseous contact with the cavity.

10. Apparatus according to claim 1 in which means are provided for supplementing the natural cooling of the cavity.

11. Apparatus according to claim 10 in which the means for supplementing the natural cooling of the cavity comprise one or more pipes in contact with the housing bounding the cavity.

12. Apparatus according to claim 11 in which the one or more pipes are configured to receive a flow of fluid at variable rates.

13. Apparatus according to claim 1 in which there is provided means for supplying supplemental energy to melt material within said cavity.

14. Apparatus according to claim 13 in which the means for supplying supplemental energy is a plasma or plasma torch.

15. Apparatus according to claim 13 in which the means for supplying supplemental energy is a second microwave source.

16. Apparatus according to claim 13 in which the means for supplying supplemental energy is an induction heater.

17. Apparatus accordingly to claim 13 in which the means for supplying supplemental energy is means for providing preferential thermal conduction between a first and a second location within the cavity.

18. A method of forming apparatus for melting material comprising:
   supplying a fusible particulate material to the interior of a microwave cavity, the microwave cavity being at least partially bounded by walls;
   cooling the exterior of the cavity;
   supplying microwave energy to the cavity of such power that at least a portion of the fusible particulate material within the cavity melts to form a melt pool, at least a portion of the melt pool being spaced from the cavity walls by a layer of unmelted fusible particulate material; and
   causing a portion of the melted material to re-solidify around the melt pool such that a crucible formed from the melted and re-solidified fusible particulate material is provided within the cavity, at least a portion of the crucible being spaced from the cavity walls by the layer of unmelted fusible particulate material.

19. A method according to claim 18 in which the re-solidification is caused by decreasing the microwave energy input.

20. A method according to claim 18 in which the re-solidification is caused by increasing the exterior cooling of the cavity.

21. A method according to claim 18 in which the melt pool is allowed to at least partially drain from the cavity so as to form a void.

22. A method according to claim 21 in which further feed material is heated due to plasma formation in the void left by the material drained from the cavity.

23. A method according to claim 18 in which the fusible particulate material is initially heated by use of a plasma torch.

24. A method according to claim 18 in which the fusible particulate material is initially heated by applying microwave energy to lossy material present within the microwave cavity.

25. A method according to claim 18 in which the melt pool is tapped by melting the material between the melt pool and an exit aperture in the cavity.

26. A method according to claim 25 in which the melting of the material between the melt pool and the exit aperture in the cavity is affected by the application of a plasma torch.

27. A method according to claim 25 in which the melting of the material between the melt pool and the exit aperture in the cavity is affected by the application of an induction heater.

28. A method according to claim 25 in which the melting of the material between the melt pool and the exit aperture in the cavity is affected by preferential conduction of heat away from the melt pool towards the exit aperture.

29. A method of melting a fusible material comprising:
   supplying particles of fusible material to the interior of a microwave cavity bounded at least in part by walls, the fusible material entering a crucible formed from melted and re-solidified material and spaced apart from the walls of the cavity by a layer of unmelted particulate material; and
   melting the fusible material fed to the cavity and crucible by energy being supplied to the crucible in the form of microwave energy, the melted fusible material subsequently being tapped from the crucible by melting the material between the melted fusible material and an exit aperture in the cavity.

30. A method according to claim 29 in which the fusible material comprises glass particles.

31. A method according to claim 29 in which the fusible material comprises materials that when melted form glass.

32. A method according to claim 29, wherein the fusible material includes sand, sodium carbonate, lime or calcium carbonate for forming glass.

33. A method according to claim 29 in which other materials which are not intended to be melted, but dispersed within the melt are added.

34. A method according to claim 29 in which the microwave energy applied to the cavity is tuned.

35. A method according to claim 29 in which the fusible material is fed to the cavity under gravity feed conditions.

36. A method according to claim 29 in which the method includes providing further energy input to the fusible material by means of a plasma torch.

37. A method according to claim 29 in which the plasma torch is used to apply energy initially to the cavity to give partial melting of the fusible material.

38. A method according to claim 29 in which a plasma torch below the crucible is used to melt the material between the melted fusible material and the exit aperture of the cavity.

39. A method according to claim 29 wherein further energy is input to the fusible material by an induction heater.

40. A method according to claim 29 wherein further energy is input to the fusible material by microwaves applied to lossy materials introduced in the cavity.

41. A method according to claim 29 wherein further energy is input to the fusible material by preferential conduction.

42. A method according to claim 29 in which an induction heater is used to melt the material between the melted fusible material and an exit aperture in the cavity.

43. A method according to claim 29 in which preferential conduction of heat away from the molten core, towards the tapping aperture, is used to melt the material between the melted fusible material and an exit aperture in the cavity.

44. A method accordingly to claim 18, where the microwave energy is supplied to the cavity such that the melt pool is completely enclosed within a surrounding bounding layer of the fusible particulate material.

45. A method accordingly to claim 18, where the portion of the melted pool material is re-solidified so that the resulting crucible has a hollow interior that bounds the melt pool on all sides.

* * * * *

UNITED STATES PATENT AND TRADEMARK OFFICE
CERTIFICATE OF CORRECTION

PATENT NO. : 6,568,215 B2
DATED : May 27, 2003
INVENTOR(S) : Schofield et al.

It is certified that error appears in the above-identified patent and that said Letters Patent is hereby corrected as shown below:

<u>Title page,</u>
Item [56], References Cited, OTHER PUBLICATIONS, after "Program," change "19983-86" to -- 1985-86 --
Item [57], ABSTRACT,
Line 10, after "crucible" change "form" to -- from --.

<u>Column 2,</u>
Line 19, after "used" insert a period

<u>Column 3,</u>
Line 62, before "inductor" change "a" to -- an --

<u>Column 14,</u>
Lines 17 and 21, after "method" change "accordingly" to -- according --

Signed and Sealed this

Eighth Day of June, 2004

JON W. DUDAS
*Acting Director of the United States Patent and Trademark Office*